US009358707B2

(12) United States Patent
Parker

(10) Patent No.: US 9,358,707 B2
(45) Date of Patent: Jun. 7, 2016

(54) DEVICE FOR LOCATING A FIRST AEROSPACE COMPONENT RELATIVE TO A SECOND AEROSPACE COMPONENT

(75) Inventor: Simon John Parker, Bristol (GB)

(73) Assignee: Airbus Operations Limited, Bristol (GB)

( * ) Notice: Subject to any disclaimer, the term of this patent is extended or adjusted under 35 U.S.C. 154(b) by 729 days.

(21) Appl. No.: 13/067,210

(22) Filed: May 17, 2011

(65) Prior Publication Data

US 2011/0299918 A1 Dec. 8, 2011

(30) Foreign Application Priority Data

May 17, 2010 (GB) .................................. 1008181.8

(51) Int. Cl.
| | | |
|---|---|---|
| *F16D 1/08* | (2006.01) | |
| *F16D 3/80* | (2006.01) | |
| *F16L 17/00* | (2006.01) | |
| *B29C 45/14* | (2006.01) | |
| *B29L 31/30* | (2006.01) | |
| *B29L 31/00* | (2006.01) | |
| *F16B 3/00* | (2006.01) | |
| *F16B 11/00* | (2006.01) | |

(52) U.S. Cl.
CPC ...... *B29C 45/1418* (2013.01); *B29L 2031/3076* (2013.01); *B29L 2031/727* (2013.01); *F16B 3/005* (2013.01); *F16B 11/006* (2013.01); *Y10T 403/47* (2015.01)

(58) Field of Classification Search
CPC .............. Y10T 403/47; B29C 45/1418; B29C 2031/3076; B29C 2031/727; F16B 3/005; F16B 11/006

USPC .......... 403/15, 31, 33; 156/581, 583.1, 583.3; 264/266, 263, 313, 314; 248/560, 562
See application file for complete search history.

(56) References Cited

U.S. PATENT DOCUMENTS

| | | | | |
|---|---|---|---|---|
| 2,800,920 A | * | 7/1957 | Smith ...................... | 137/512.15 |
| 3,126,029 A | * | 3/1964 | Englesson .................... | 137/855 |
| 3,494,588 A | * | 2/1970 | Kisling ............................. | 251/5 |
| 3,907,169 A | * | 9/1975 | Gortz et al. ..................... | 222/95 |
| 3,978,566 A | * | 9/1976 | Ladin ........................ | 29/898.066 |
| 4,783,045 A | * | 11/1988 | Tartaglino .................... | 251/61.1 |
| 5,277,397 A | * | 1/1994 | Tartaglino ........................ | 251/61 |
| 5,713,104 A | * | 2/1998 | Giampaolo, Jr. ................ | 16/422 |
| 6,481,911 B1 | | 11/2002 | Streuber | |
| 6,607,368 B1 | * | 8/2003 | Ross et al. ..................... | 417/412 |
| 6,964,134 B2 | * | 11/2005 | Chaffee ......................... | 52/2.17 |
| 7,281,682 B2 | * | 10/2007 | D'Auvergne .................. | 244/63 |
| 7,526,164 B2 | * | 4/2009 | Ouderkirk et al. ............. | 385/115 |
| 7,829,003 B2 | * | 11/2010 | DeBiasi et al. ................ | 264/255 |
| 2003/0037379 A1 | * | 2/2003 | Gibson et al. .................. | 5/655.3 |
| 2004/0109962 A1 | * | 6/2004 | Usami et al. ................. | 428/35.2 |
| 2010/0139850 A1 | * | 6/2010 | Morris et al. .................. | 156/242 |

OTHER PUBLICATIONS

Search Report for GB 1008181.8, dated Sep. 13, 2010.

* cited by examiner

*Primary Examiner* — Gregory Binda
*Assistant Examiner* — Nahid Amiri
(74) *Attorney, Agent, or Firm* — Nixon & Vanderhye P.C.

(57) ABSTRACT

A device for locating a first aerospace component relative to a second aerospace component, comprising a bladder with a flexible membrane which defines a fluid receiving space such that, when a hardenable hydraulic fluid is injected into the bladder, said membrane is urged to deform into abutment with said first and second aerospace components to locate said components relative to each other when the hydraulic fluid hardens.

26 Claims, 8 Drawing Sheets

DEVICE FOR LOCATING A FIRST AEROSPACE COMPONENT RELATIVE TO A SECOND AEROSPACE COMPONENT

This application claims priority to GB Patent Application No. 1008181.8 filed 17 May 2010, the entire contents of which is hereby incorporated by reference.

INTRODUCTION

The present invention relates to a device for locating aerospace components relative to each other. Particularly, but not exclusively, the invention relates to a device for connecting, locating, driving, clamping, locking or shimming a first aerospace component relative to a second aerospace component. Other aspects of the present invention relate to a joint comprising first and second components located relative to each other by such a device, and a method of locating a first aerospace component relative to a second aerospace component.

BACKGROUND

Aircraft are assembled from a number of separate assemblies which are fixedly mounted to each other during assembly of the aircraft. Such an assembly includes wing boxes, leading and trailing edges of a wing, horizontal tail planes (HTPs), Vertical Tail Planes (VTPs) and the fuselage, which are themselves formed from a number of discrete components including spars, ribs, skin, gunnels, compression struts, and stringers which are positioned relative to and fixedly mounted to each other.

Such components and subassemblies have stringent tolerances and are generally fixedly located relative to each other using conventional mechanical fixings, such as bolts and rivets, received in pre-formed holes extending through a section of each component to be fixedly located. Although such conventional fixings form a secure joint to fixedly locate adjacent surfaces, they are known to have a number of disadvantages when used in an aerospace assembly.

Conventional fixings are known to cause metal fatigue and localised stress concentrations of the area proximal to each pre-formed hole, which may lead to a structural failure of the joint and/or the components, and cause, for example, fuel leakage or overall breakdown of the aircraft.

Furthermore, mechanical fixtures made of metal may in particular pose a problem to aircrafts formed from carbon fibre composites if the aircraft was to be struck by lightening, as this may cause electrical failure or ignition of the fuel held in the fuel tank.

There has been a move within the aerospace industry towards components formed of carbon fibre materials, which have certain weight and strength advantages over their to metallic counterparts, such as aluminium sheet, moulding or extrusion. One issue with components formed from carbon fibre composite materials is that although one surface is generally produced to an exact tolerance, the opposing surface is generally of low tolerance, typically up to +/−4%, depending on the process used. With conventional fixings it is not possible for these inevitable manufacturing tolerances to be taken up is during assembly, and so it is necessary to modify or shim components to obtain the exact tolerances needed to ensure the desired joint, which is a complex and time-consuming process.

Irrespective of the manufacturing technique of aircrafts, there will be gaps and voids between the structural components as they are assembled. These gaps may be filled with shims or post machining adjustment techniques may be employed to meet the close tolerances of the components. Consequently, the manufacturing of aircraft is time consuming and usually results in wastage and a high scrap rate such that it is difficult to manufacture and assembly high volumes of aircrafts and aeronautical components, whilst also meeting the requirements for close tolerance, which is particularly difficult when utilising carbon fibre composites. It is therefore desirable to provide an apparatus which allows for the inevitable manufacturing misalignments generated from manufacturing tolerances to be taken up.

The present invention therefore seeks to provide a device for locating a first aerospace component relative to a second aerospace component which substantially overcomes or alleviates the known problems discussed above.

SUMMARY OF THE INVENTION

According to the present invention a device is provided for locating a first aerospace component relative to a second aerospace component, comprising a bladder with a flexible membrane which defines a fluid receiving space such that, when a hardenable hydraulic fluid is injected into the bladder, said membrane is urged to deform into abutment with said first and second aerospace components to locate said components relative to each other when the hydraulic fluid hardens.

Preferably, the device further comprises an inlet communicating with said fluid receiving space to allow the flow of a hydraulic fluid into said fluid receiving space. A valve may be disposed at the inlet to open and close the inlet.

Preferably, the device further comprises an outlet communicating with said fluid receiving space to allow the flow of a hydraulic fluid out of said fluid receiving space. A valve may be disposed at the outlet to open and close the outlet.

Advantageously, the bladder is elongate.

Conveniently, the membrane comprises opposing upper and lower walls and foldable side walls extending between said upper and lower walls.

In one embodiment, each sidewall comprises two fold portions extending inwardly towards the centre of the fluid receiving space when the bladder is in an undeformed state.

Preferably, inner surfaces of the sidewalls abut inner surfaces of the upper and lower walls when the bladder is in an undeformed state.

The device may further comprise a hydraulic fluid which is injected into the fluid receiving space and which urges the membrane to deform into abutment with each of said first and second aerospace components to locate said components relative to each other.

In a preferred embodiment, the fluid is configured to harden in the fluid receiving space such that the bladder is maintained in a deformed shape. The fluid may be a curable resin.

Advantageously, reinforcing materials are suspended in the curable resin.

The flexible membrane may be resilient.

Conveniently, a bonding means is disposed on an outer surface of the membrane, such that when the membrane is urged to deform into abutment with a surface of said aerospace components, the bonding means fixedly mounts the membrane to said surface.

Advantageously, the bonding means is a bonding resin, tape or adhesive and the bonding means may be an anaerobic bonding adhesive.

According to another aspect of the present invention, there is provided a joint comprising first and second components located relative to each other by means of a device comprising a bladder with a flexible membrane which defines a fluid receiving space such that, when a hardenable hydraulic fluid is injected into the bladder, said membrane is urged to deform into abutment with said first and second aerospace components to locate said components relative to each other when the hydraulic fluid hardens.

Preferably, a recess is formed in a surface of one of the first and second components such that the membrane expands into the recess when the membrane is urged into a deformed shape and the device is prevented from shearing relative to said surface in a direction along the plane of said surface.

Conveniently, a plurality of recesses are formed in said surface.

According to another aspect of the present invention, there is provided a method of locating a first aerospace component relative to a second aerospace component comprising the steps of disposing a device comprising a bladder with a flexible membrane which defines a fluid receiving space between opposing faces of a first component and a second component, and injecting a hydraulic fluid into the bladder so that said membrane is urged to deform into abutment with each of said opposing surfaces of said first and second aerospace components to locate said components relative to each other.

The device may further comprise an inlet communicating with said fluid receiving space to allow the flow of a hydraulic fluid into said fluid receiving space and an outlet communicating with said fluid receiving space to allow the flow of a hydraulic fluid out of said fluid receiving space, and the method may further comprise the steps of injecting fluid into the bladder through the inlet, opening the outlet to allow air to escape from the bladder, and subsequently closing the outlet such that pressure is built up in the fluid receiving space.

The method advantageously further comprises the step of closing the inlet when the membrane has expanded into abutment with said first and second components, and hardening said hydraulic fluid to fixedly locate said components relative to each other.

According to another aspect of the present invention, there is provided an assembly of components comprising the steps of disposing a device comprising a bladder with a flexible membrane which defines a fluid receiving space between opposing faces of a first component and a second component, and injecting a hydraulic fluid into the bladder so that said membrane is urged to deform into abutment with each of said opposing surfaces of said first and second aerospace components to locate said components relative to each other.

Embodiments of the invention will now be described, by way of example only, with reference to the accompanying drawings, in which:

DESCRIPTION OF THE PREFERRED EMBODIMENTS

Figure 1:
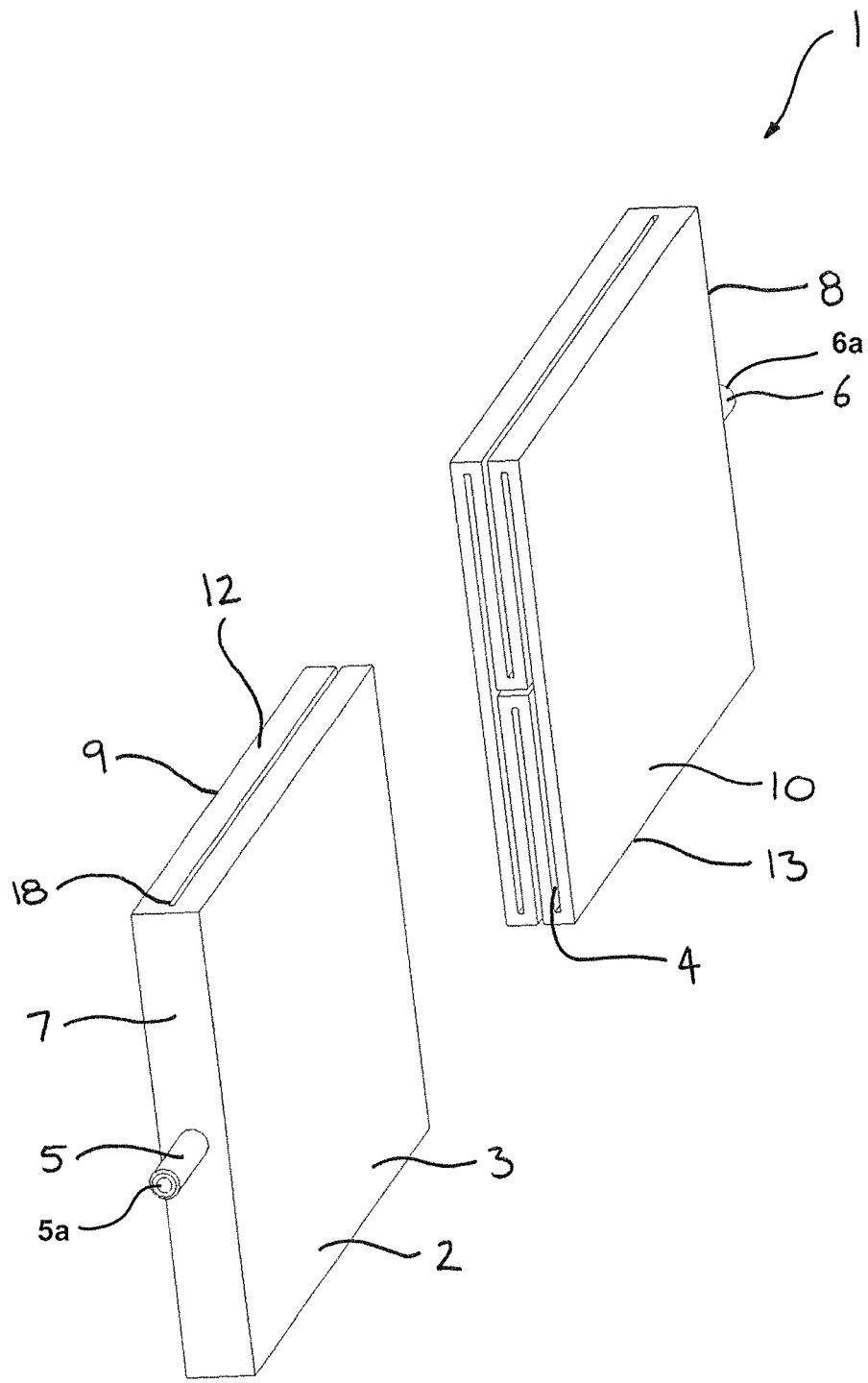
FIG. 1 is a perspective view of a device for locating a first aerospace component relative to a second aerospace component showing the device in an unexpanded state, the device being shown in cut-through to illustrate its cross-sectional arrangement.
Figure 2:
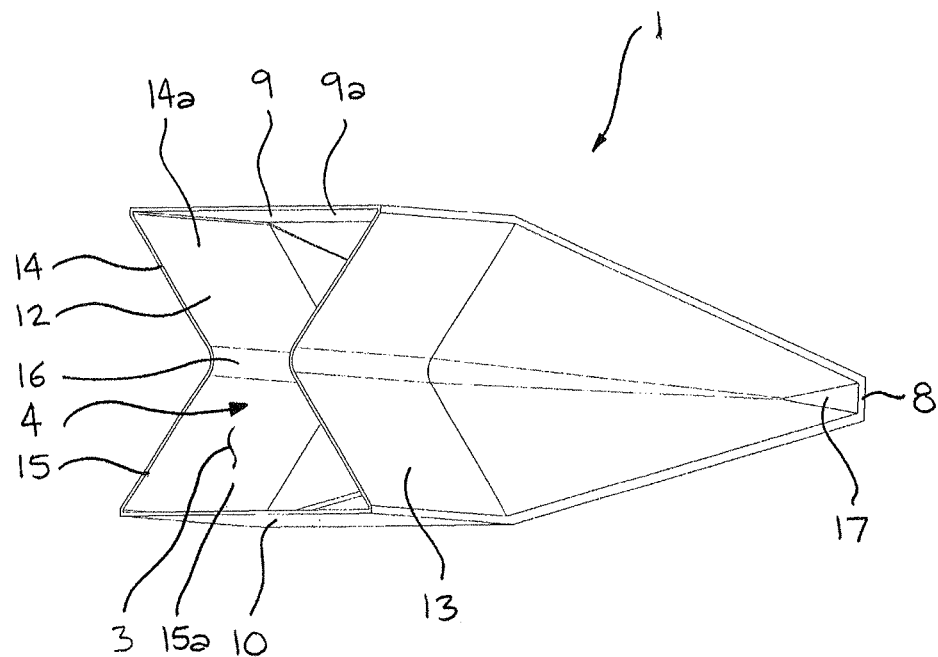
FIG. 2 is a cross-sectional perspective view of the device illustrated in FIG. 1, showing the device in an expanded state.
Figure 3:
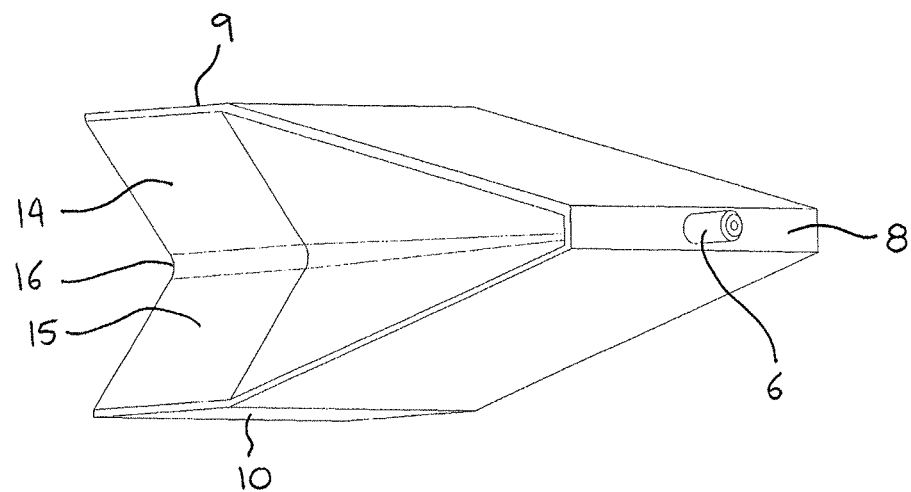
FIG. 3 is another cross-sectional view of the device illustrated in FIG. 1, showing the device in an expanded state.
Figure 4:
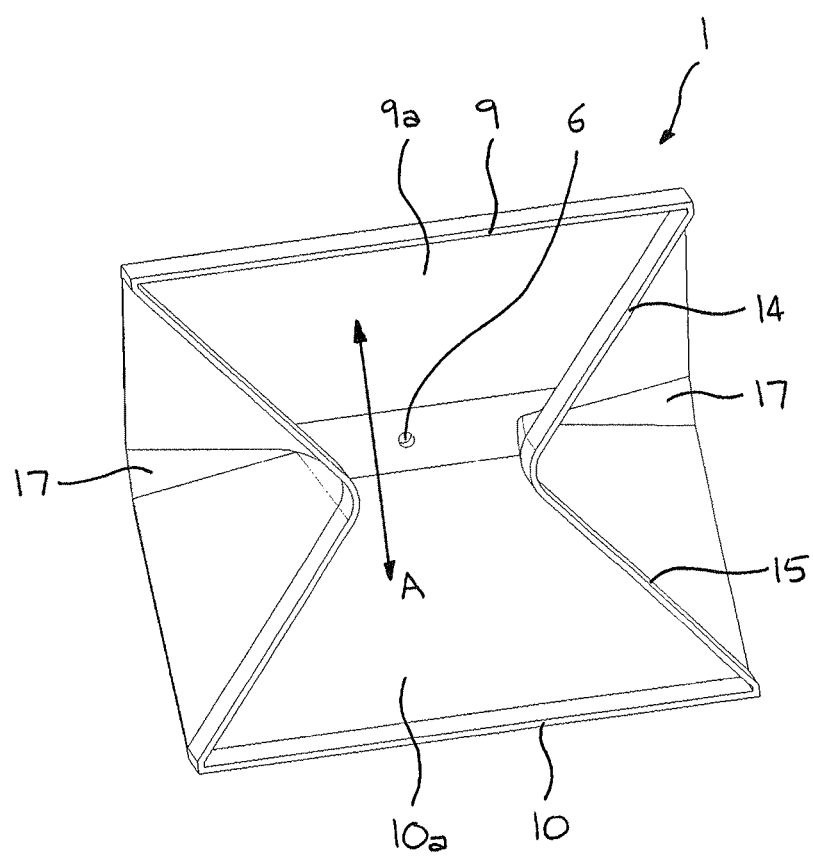
FIG. 4 is another cross-sectional view of the device illustrated in FIG. 1, showing the device in an expanded state.
Figure 5:
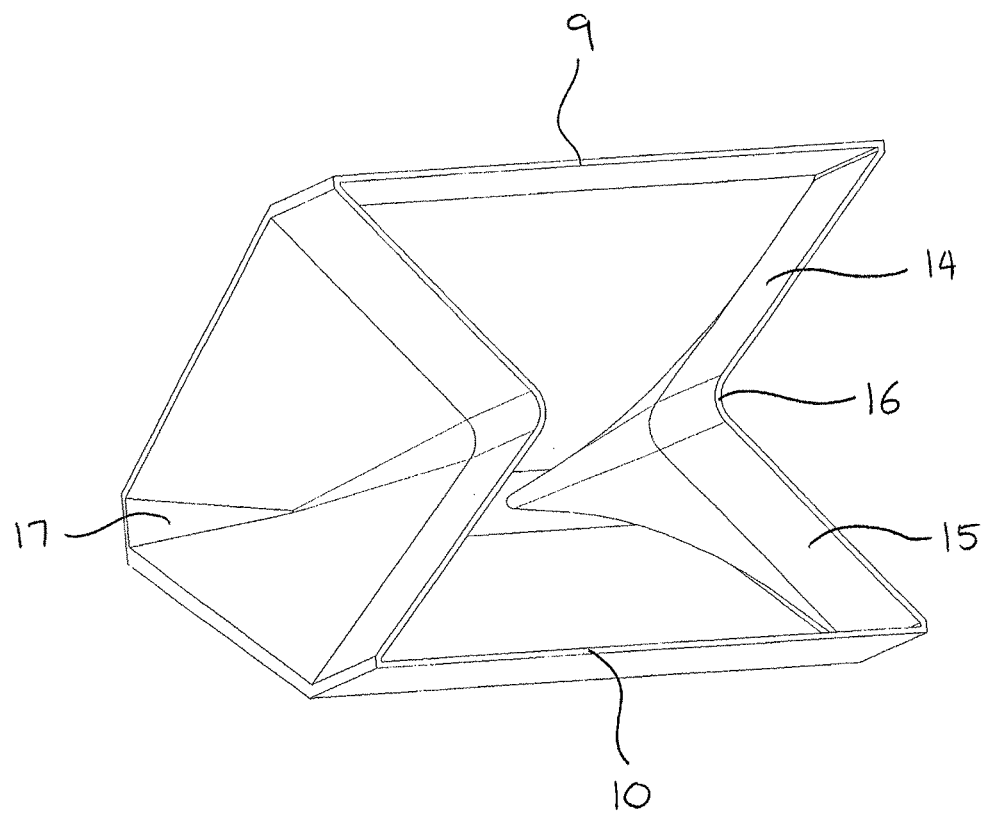
FIG. 5 is another cross-sectional view of the device illustrated in FIG. 1, showing the device in an expanded state.

Referring now to the accompanying drawings, a device 1 for locating a first aerospace component relative to a second aerospace component is shown in FIGS. 1 to 5 comprising a bladder 2 formed from a flexible, incompressible membrane 3, which encloses and defines a fluid receiving space 4. An inlet 5 and an outlet 6 communicate with the fluid receiving space 4 at opposing ends of the bladder 2. Prior to use, as seen in FIG. 1, the device 1 is in an unexpanded state and is generally elongate and cuboidal in shape, although the device is not limited as such, as will be explained hereinafter. The bladder 2 has a front wall 7 and a rear wall 8 at opposing ends of the bladder 2, an upper and a lower wall 9, 10 and two sidewalls 12,13, each extending between the upper and lower walls 9,10. The inlet 5 extends through the front wall 7 to communicate with the fluid receiving space 4 and the outlet 6 extends through the rear wall 8 to communicate with the fluid receiving space 4.

When the device 1 is in an undeformed position, the side walls 12, 13 of the membrane 3 are folded back on themselves to form a corrugation with inner folded portions 14, 15 (refer to FIG. 2) which extend inwardly towards the centre of the fluid receiving space 4. Inner faces 14a, 15a of the inner folded portions 14, 15 locate against inner faces 9a, 10a of the upper and lower walls 9, 10 respectively such that the inner folded portions 14,15 extend parallel to the upper and lower walls 9, 10 with an inner edge 16 of the inner folded portions 14, 15 lying proximate to the centre of the fluid receiving space 4 and resulting in the fluid receiving space 4 having an H-shaped cross-section, as can be appreciated from FIG. 1. The inner folded portions 14, 15 extend between the front and rear walls 7, 8 at opposing ends of the bladder 2, and are integrally formed with each other at front and rear ends to form end edges 17 which extend parallel to the front and rear walls 7,8 in the undeformed state, and an outer end 18 of each end edge 17 extends to, and is formed with the respective front or rear wall 7, 8. Although the side walls 12, 13 of the membrane 3 are folded back on themselves in the present embodiment to form folded portions, it is envisaged that the membrane in its undeformed state is a flattened bladder with upper and lower walls locating against each other.

In the present embodiment, the front and rear walls 7,8 have a thicker cross-section than the side walls 12, 13 and upper and lower walls 9, 10. Therefore, the front and rear walls 7, 8 are more prone to retain their shape when the side walls 12, 13 and upper and lower walls 9, 10 deform, as will be explained hereinafter.

The membrane is formed from a flexible, incompressible membrane, such as roll formed metallic tubing or a reinforced elastomer. It is envisaged that in one embodiment the membrane is resilient. Furthermore, the bladder 2 may comprise rigid upper and lower walls 9, 10 with flexible and/or flexible and resilient walls extending therebetween.

The flexible membrane 3 deforms when a fluid medium is introduced under pressure into the fluid receiving space 4 via the inlet 5. If the outlet 6 is closed, then the pressure in the fluid receiving space increases and this increased pressure in the fluid receiving space 4 causes the flexible membrane to deform outwardly, so that the distance between the upper and lower walls 9, 10 of the device 1 increases as indicated by the arrow denoted 'A' in FIG. 4, and the upper and lower walls 9, 10 are able to move away from each other due to the inner folded portions 14, 15 of the side walls 12, 13 unfolding. Therefore, in the present embodiment the upper and lower walls 9, 10 remain parallel to each other along the length of the device 1, although they may deform to fit mating surfaces.

The fluid, such as a resin together with a catalyst, introduced into the fluid receiving space 4 via the inlet 5 is curable, for example by thermic or anaerobic curing, so that when the pressure in the fluid receiving space achieves a predetermined pressure, then the fluid is allowed to harden and the device 1 is provided with structural integrity enabling it to withstand the forces exerted on the device by the adjacent aeronautical components and the aircraft during operation.

It is envisaged that the fluid introduced into the fluid receiving space 4 via the inlet 5 is settable to form a solid once the membrane 3 has been expanded into contact with, and locates, the desired components, as will become apparent hereinafter. The fluid is a resin which is initially injected into the bladder 2 as a liquid to hydraulically urge the membrane 3 to deform and expand, but which subsequently cures into a solid state to set the membrane 3 in its expanded position. Although in the following exemplary embodiments an uncured resin is used, it will be appreciated that the fluid is not limited thereto and that the substance may be any material which can be injected into the fluid receiving space 4 to act as an hydraulic fluid and which subsequently cures and/or sets in a solid state to maintain the bladder 2 in its expanded position. In another embodiment, the fluid is a resin with reinforcing materials 25, such as finely chopped fibres or nano-particles, suspended in it, in order to prevent the breakup and dusting of the resin once it has cured and subjected to movement, such as vibration.

A valve 5a, for example a manual, sprung or self-bleed type, is disposed on the inlet 5 to the fluid receiving space 4, and another valve 6a is disposed on the outlet 6 to the fluid receiving space 4. The inlet valve 5a opens and closes the inlet 5 and the outlet valve 6a opens and closes the outlet 6. Therefore a fluid passageway is provided through the device 1.

Figure 6:
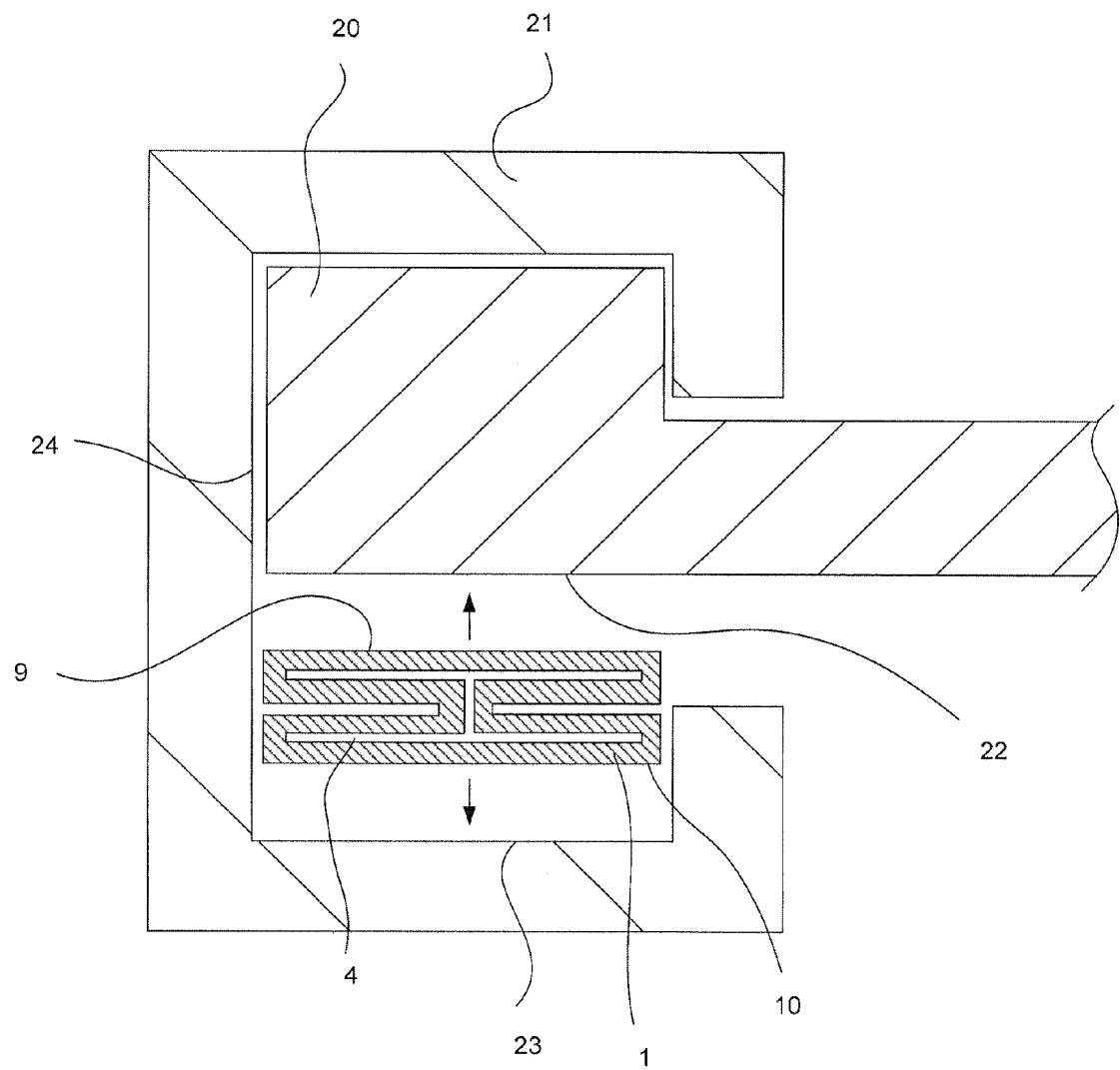
FIG. 6 is a cross-sectional view of a joint including the device shown in FIG. 1.

One application of the device will now be described with reference to FIG. 6 which shows the device disposed to locate a first component 20 relative to a second component 21, as well as FIGS. 1 to 5.

The device 1 is disposed in a space between opposing surfaces 22, 23 of the first and second components 20, 21 respectively. The bladder 2 in its undeformed shape is relatively compact and so is easily inserted into the space.

A fluid inlet means (not shown), such as a pump, is connected to the inlet 5 to inject a curable resin 24 into the fluid receiving space 4 of the device 1. A user opens the inlet valve 5a such that the resin 24 in a liquid state is injected into the fluid receiving space 4. When fluid is received in the fluid receiving space 3, air bubbles may become trapped which can reduce the mechanical properties of the device 1 and encourage break down of the resin. To overcome this, the outlet 6 is initially opened when fluid is introduced into the device 1 to facilitate the expulsion of any air trapped within the fluid receiving space 4. Once a user observes that all the air has been expelled from the fluid receiving space 4 and that there is no air being drawn from the outlet, then the outlet 6 is closed.

Thereafter, the pressure in the fluid receiving space 4 increases because fluid is injected into the fluid receiving space 4, but is not expelled therefrom. The membrane 3 of the bladder 2 is then urged to deform outwardly due to the increased pressure of the fluid in the fluid receiving space 4 and so the device expands as the volume of fluid in the fluid receiving space 4 increases.

As the membrane deforms and the bladder 2 expands outwardly, the upper and lower walls 9, 10 of the bladder are urged away from each other and into contact with corresponding surfaces 22, 23 of the first and second components 20, 21 respectively. The side walls 12, 13 unfold as the bladder 2 expands and contact upstanding walls 24 of the second component 21.

When the upper and lower walls 9, 10 abut the corresponding surfaces 22, 23 of the first and second components 20, 21, the device exerts a force on the opposing surfaces 22, 23 and they are urged away from each other, so that the first component 20 is urged to locate into its desired position by the device acting on it. The bladder 2 is constrained by the walls of the components and so a pressure is exerted on the surface of each component by the bladder being deformed outwardly and abutting against each surface. In a situation in which the first component is already positioned in its desired location with respect to the second component then the device locates the first component in its desired position to retain the first component in position.

Once a predetermined fluid pressure in the fluid receiving space 4 is achieved, or it is observed that the first and second components are fixedly located in their desired position with respect to each other, then the inlet valve 5 is closed. Therefore, the resin 24 is retained in the bladder 2. The pressure exerted in the device 1 causes the temperature of the curable resin 24 to increase and so the resin hardens, thereby locking the first and second components 20, 21 with respect to each other. Alternatively, or additionally, an external curing heat may be supplied. In its expanded state, the upper and lower walls 9, 10 of the bladder 2 converge towards the front and rear walls 7, 8.

It will be understood that two or more devices may be connected in series. In such an arrangement, in which the two or more devices are connected in series, for example via a manifold, then each device would each achieve the same pressure provided by the injection pump and so avoid local stress concentrations.

In one embodiment, it is envisaged that an adhesive 27 is applied to the outer surface of the membrane 3 of the or each device so that, when the membrane is urged to deform into abutment with a surface of the or each aerospace component, the adhesive 27 fixedly mounts the membrane 3 to the component surface to restrict shearing of the device relative to the or each aerospace component and to improve rigidity of the joint. Although in the preferred embodiment, the adhesive 27 is an anaerobic curing adhesive which cures when the device is activated and air is excluded between the bladder and abutting component surface, it will be understood that any bonding means may be used such as tape or adhesive.

In another embodiment, a thick coating or penetrable material is bonded to the outer surface of the membrane 3 of the or each device along the surfaces of the upper and/or lower walls 9, 10. It is envisaged that an array of projections (not shown) upstand from an opposing surface of the or each aerospace component such that, when the membrane is urged to deform into abutment with said surface of the or each aerospace component, the projections penetrate the thick coating or penetrable material to fixedly mount the upper and/or lower walls of the membrane to the or each aerospace component. It is envisaged that various projection profiles may be used, for example conical spikes and inclined conical spikes.

An advantage of the device 1 is that a pressure is applied over a large surface area and it enables a uniform pressure to be applied along the area of the bladder in contact with and surface, and so does not lead to stress concentration points.

Although one arrangement of the first component 20, the second component 21 and the device 1 is described and shown, it will be appreciated that other arrangements are possible. The pressure applied by the bladder 2 upon deforming of the bladder 2 on components is used to take up manufacturing tolerances or gaps, and/or to drive components relative to each other, such as deforming a skin of a wing box onto a theoretical outer mould line to pre-load a wing box assembly. Furthermore, it can be used as a non-penetrative fixing solution or as a shim which allows for aeronautical components having large manufacturing tolerances to be used because it is also possible to take up any gaps between, or deformities in, the surfaces of the components.

A further application of the device 1 will now be described with reference to FIGS. 7 to 9, together with FIGS. 1 to 5. In this application two devices 1a, 1b are used to locate a first component 20 relative to a second component 21, so as to automatically adjust for manufacturing tolerances and to lock the assembly in the correct relative positions.

Figure 7:
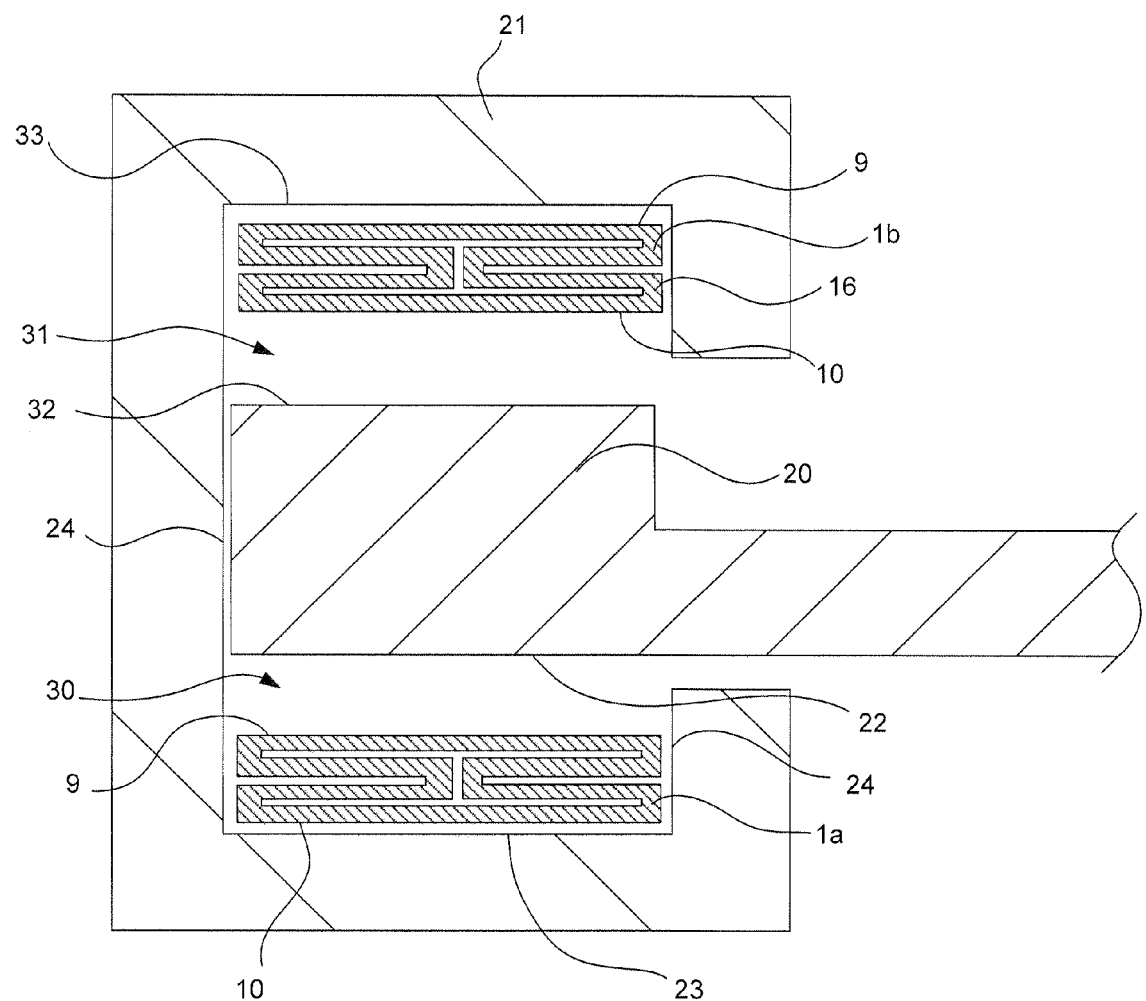
FIG. 7 is a cross-sectional view of a joint including a pair of the devices shown in FIG. 1 in an unexpanded state.

Referring to FIG. 7, a first device 1a is disposed in a first space 30 between first opposing surfaces 22, 23 of the first and second components 20, 21 respectively. Similarly, a second device 1b is disposed in a second space 31 between second opposing surfaces 32, 33 of the first and second components 20, 21 respectively.

The bladder 2 of each device in its undeformed shape is relatively compact and so is easily inserted into the space.

A fluid inlet means (not shown), such as a pump, is connected to the inlet valve 5 of the first device 1a to inject fluid into the fluid receiving space 4 of the first device 1a. A user opens the inlet 5 and resin in a liquid state is injected into the fluid receiving space 4 of the first device 1a. As described above, the outlet valve of the first device 1a is initially opened when fluid is introduced to facilitate the expulsion of any air trapped within the fluid receiving space 4. Once a user observes that all the air has been expelled from the fluid receiving space 4 and that there is no air being drawn from the outlet, then the outlet valve of the first device 1a is closed.

Thereafter, the pressure in the fluid receiving space 4 increases and the membrane 3 of the bladder 2 is urged to deform outwardly. As the membrane 3 of the first device 1a deforms and the bladder 2 expands outwardly, the upper and lower walls 9, 10 of the first device 1a are urged into contact with the first corresponding surfaces 22, 23 of the first and second components 20, 21 respectively. At the same time, the side walls 12, 13 of the first device 1a unfold as the bladder 2 expands and contact upstanding walls 24 of the second component 21.

Figure 8:
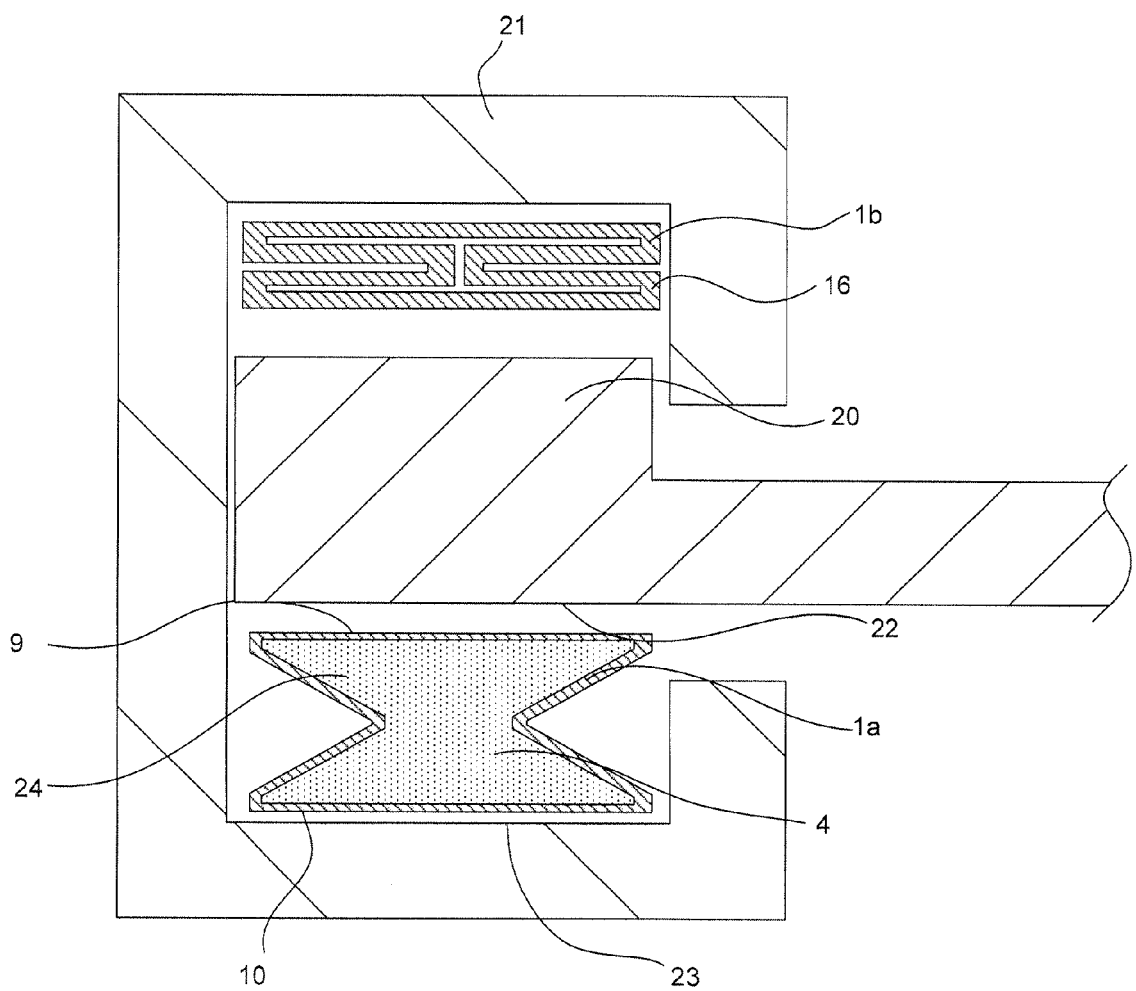
FIG. 8 is a cross-sectional view of the joint shown in FIG. 7, with one of the devices in an expanded state.
Figure 9:
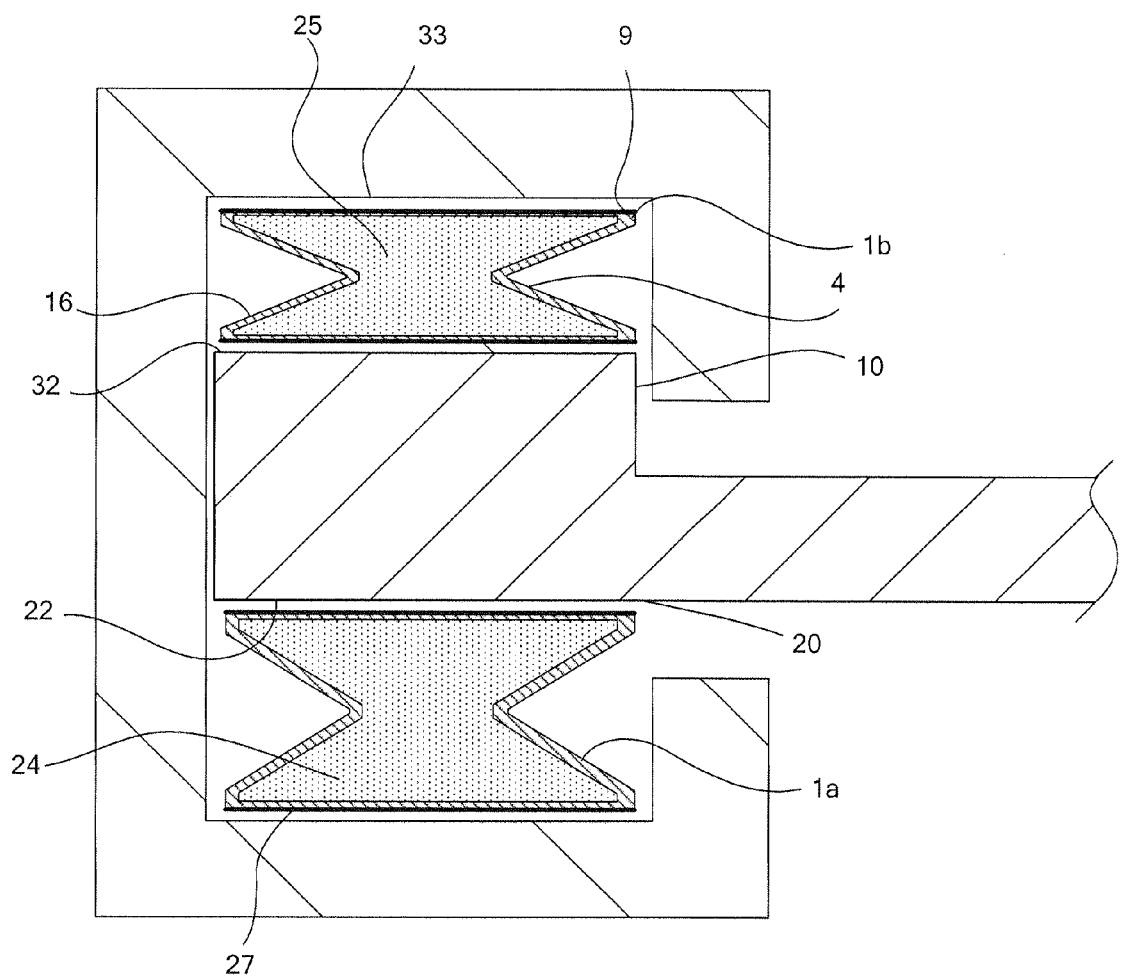
FIG. 9 is a cross-sectional view of the joint shown in FIG. 7, with both of the devices in an expanded state.

When the upper and lower walls 9, 10 of the first device 1a abut the corresponding surfaces 22, 23 of the first and second components 20, 21, the first device 1a exerts a force on the opposing surfaces 22, 23 and they are urged away from each other, so that the first component 20 moves relative to the second component 21 until it is disposed in its desired position, as shown in FIG. 8.

The inlet valve is closed when the first and second components 20, 21 are located in their desired position with respect to each other and the resin in the first device 1a is then cured.

The fluid inlet means is then connected to the inlet valve of the second device 1b to inject fluid into the fluid receiving space of the second device 1b. A user opens the inlet valve such that the resin in a liquid state is injected into the fluid receiving space 4 of the second device 1b. As explained above, the outlet valve of the second device 1b is initially opened when fluid is introduced to facilitate the expulsion of any air trapped within the fluid receiving space 4.

Upon closure of the outlet valve, the pressure in the fluid receiving space increases and so the second device 1b expands outwardly. The upper and lower walls 9, 10 of the second device 1b are urged into contact with second corresponding surfaces 32, 33 of the first and second components 20, 21 respectively, as shown in FIG. 9. The side walls 12, 13 unfold as the second device bladder 2 expand and contact the upstanding walls 24 of the second component 21.

When the upper and lower walls 9, 10 of the second device 1b abut the second corresponding surfaces 32, 33 of the first and second components 20, 21 respectively, the second device 1b exerts a force on the opposing second surfaces 32, 33. The first component 20 is already positioned relative to the second component 21 by the first device 1a, and so that the first component 20 is fixedly located in its desired position by the second device 1b acting on it, and urging it against the first device 1a. The bladder 2 of the second device 1b is constrained by the walls of the components and so a pressure is exerted on the surface of each component by the bladder being deformed outwardly and abutting against each surface.

Once a predetermined fluid pressure in the fluid receiving space 4 is achieved, then the inlet valve is closed and the resin is retained in the bladder 2 and subsequently cured, thereby locking the first and second components 20, 21 with respect to each other.

Although the device has been described to comprise an outlet 6, it will be appreciated that the device 1 may be formed without an outlet 6. Furthermore, although the shape of the undeformed device is described as an elongate cuboid above, it will be understood that other shapes are possible, dependent on the application and the gap to be shimmed or the components to be located relative to each other.

In another embodiment of the invention, it is envisaged that a recess or plurality of recesses (not shown) are formed in the surfaces of the components against which the membrane 3 of the device will abut. In this embodiment, Although, in the above described embodiment recesses are formed in each component, it is envisaged that recesses may be formed in only one component. When the membrane deforms into abutment with the surface, the membrane expands into the recess and so the device is prevented from shearing relative to said surface in a direction along the plane of said surface when the membrane is rigidly set in position. The or each recess takes the form of a hemispherical recess, similar to golf ball dimples, however, it will be appreciated that any suitably shaped recess may be utilised. In one embodiment, in which the shear force will act in one direction, the recesses are one or more gulleys extending transverse to the direction of the shear force. It will be appreciated that the foregoing description is given by way of example only and that modifications may be made to the present invention without departing from the scope of the appended claims.

The invention claimed is:

1. An assembly comprising:
 a first aerospace component including a first surface;
 a second aerospace component slidably engaged with the first aerospace component and including a second surface opposite to the first surface;
 a bladder with a flexible membrane positioned between the first surface and the second surface, said membrane defines a fluid receiving space, wherein the membrane has an unfilled state in which the membrane is separated from at least one of the first and second surfaces and a filled state in which the membrane abuts both of the first and second surfaces; and a hardenable hydraulic fluid injectable into the fluid receiving space of said bladder, wherein the membrane transitions from the unfilled to the filled state upon injection of said fluid under pressure into said fluid receiving space, said membrane in the filled state is in abutment with each of said first and second surfaces to thereby fixedly locate the first and second aerospace components relative to each other, and said hydraulic fluid hardens after said membrane is placed in the filled state.

2. The assembly according to claim 1, further comprising an inlet communicating with said fluid receiving space to allow the flow of a hydraulic fluid into said fluid receiving space.

3. The assembly according to claim 2, further comprising a valve disposed at the inlet to open and close the inlet.

4. The assembly according to claim 2, further comprising an outlet communicating with said fluid receiving space to allow the flow of a hydraulic fluid out of said fluid receiving space.

5. The assembly according to claim 4, further comprising a valve disposed at the outlet to open and close the outlet.

6. The assembly according to claim 1, wherein the bladder is elongate.

7. The assembly according to claim 1, wherein the membrane comprises opposing upper and lower walls and foldable side walls extending between said upper and lower walls.

8. The assembly according to claim 7, wherein each side wall comprises fold portions extending inwardly towards the center of the fluid receiving space while the bladder is in an undeformed state.

9. The assembly according to claim 8, wherein inner surfaces of the side walls abut inner surfaces of the upper and lower walls while the bladder is in an undeformed state.

10. The assembly according to claim 1, wherein the hydraulic fluid is a curable resin.

11. The assembly according to claim 10, wherein reinforcing materials are suspended in the curable resin.

12. The assembly according to claim 1, wherein the flexible membrane is resilient.

13. The assembly according to claim 1, wherein a bonding material is disposed on an outer surface of the membrane, such that the bonding material abuts at least one of the first and second surfaces while the membrane is in the filled state.

14. The assembly according to claim 13, wherein the bonding material is a tape or adhesive.

15. The assembly according to claim 14, wherein the bonding material includes an anaerobic bonding adhesive.

16. A joint comprising first and second components located relative to each other by means of the assembly according to claim 1.

17. The joint according to claim 16, wherein a recess is formed in a surface of one of the first and second components such that the flexible membrane expands into the recess when the flexible membrane is urged into a deformed shape and the system is prevented from shearing relative to said surface in a direction along the plane of said surface.

18. An assembly comprising:
a first aerospace component including a first surface and a recess adjacent the first surface;
a second aerospace component including a second surface opposite to the first surface while the second aerospace component is received in the recess of the first aerospace component, wherein the first aerospace component is fixed relative to the second aerospace component by a bladder in the recess and between the first and second surfaces;
the bladder includes a fluid receiving space, and the bladder has a collapsed state and an expanded state, wherein the bladder is configured to be filled with a hardenable hydraulic fluid to expand the bladder from the collapsed state to the expanded state, and the bladder in the expanded state abuts against the first and second surfaces to fixedly locate the first and second aerospace components relative to each other.

19. The assembly of claim 18 further comprising an inlet on the first aerospace component to a fluid passage and configured to receive the hardenable hydraulic fluid as the fluid flows into the bladder.

20. The assembly of claim 18 wherein the bladder includes opposing upper and lower walls and foldable side walls extending between the upper and lower walls.

21. The assembly of claim 20, wherein the foldable sidewalls each include two fold portions extending inwardly towards a center of the bladder while the bladder is collapsed.

22. The assembly of claim 20, wherein an inner surface of one the foldable side walls abuts an inner surface of an opposing one of the foldable side walls while the bladder is in the collapsed state.

23. The assembly of claim 20 wherein at least one of the first and second aerospace components is formed of a composite fiber composite material.

24. The assembly of claim 20 wherein at least one of the first and second aerospace components is formed of a fiber composite material.

25. An assembly comprising:
a first aerospace component defining a chamber, wherein the chamber includes a first surface, a second surface facing the first surface and an opening between the first and second surfaces;
a second aerospace component including ridge configured to fit through the opening and slide within the chamber;
a first bladder with a flexible first membrane positioned between the first surface of the chamber and a first side of the ridge, wherein the first membrane defines a fluid receiving space within in the first bladder, and the first membrane has an unfilled state in which the first bladder is separated from at least one of the first surface and the first side, and a filled state in which the first bladder abuts both of the first surface and the first side;
a second bladder with a flexible second membrane positioned between the second surface of the chamber and a second side of the ridge, wherein the second side is opposite to the first side, and the second membrane defines a fluid receiving space within in the second bladder, and the second membrane has an unfilled state in which the second bladder is separated from at least one of the second surface and the second side, and a filled state in which the second bladder abuts both of the second surface and the second side, and
a hardenable hydraulic fluid injectable into the fluid receiving spaces of the first and second membranes, wherein the first and second membranes transition from the unfilled state to the filled state upon injection of fluid under pressure to the fluid receiving spaces and the hydraulic fluid hardens in the fluid receiving spaces to fixedly locate the first and second aerospace components relative to each other.

26. An assembly comprising:
a first aerospace component defining a chamber, wherein the chamber includes a first surface, a second surface facing the first surface and an opening between the first and second surfaces;
a second aerospace component including ridge configured to fit through the opening and slide within the chamber;

a bladder with a flexible membrane positioned between the first surface of the chamber and a first side of the ridge, wherein the membrane defines a fluid receiving space within in the bladder, and the membrane has an unfilled state in which the bladder is separated from at least one of the first surface and the first side, and a filled state in which the bladder abuts both of the first surface and the first side, and a hardenable hydraulic fluid injectable into the fluid receiving space of the membrane, wherein the membrane transitions from the unfilled to the filled state upon injection of fluid under pressure to the fluid receiving space and the hydraulic fluid hardens in the fluid receiving spaces to fixedly locate the first and second aerospace components relative to each other.

\* \* \* \* \*